United States Patent
Götz et al.

[11] Patent Number: 5,368,356
[45] Date of Patent: Nov. 29, 1994

[54] WIND GUARD FOR A CONVERTIBLE INTERIOR SPACE

[75] Inventors: Hans Götz, Boeblingen; Karl-Heinz Baumann, Bondorf, both of Germany

[73] Assignee: Daimler-Benz AG, Germany

[21] Appl. No.: 167,126

[22] Filed: Dec. 16, 1993

Related U.S. Application Data

[63] Continuation of Ser. No. 43,583, Apr. 5, 1993, abandoned, which is a continuation of Ser. No. 876,909, Apr. 30, 1992, abandoned, which is a continuation of Ser. No. 746,189, Aug. 15, 1991, abandoned, which is a continuation of Ser. No. 523,879, May 16, 1990, abandoned.

[30] Foreign Application Priority Data

May 16, 1989 [DE] Germany .................. 3915866

[51] Int. Cl.⁵ .................................. B60J 9/04
[52] U.S. Cl. ..................... 296/180.1; 296/96.21
[58] Field of Search .......... 296/85, 96.2, 180.1, 296/180.5, 96.21; 428/107, 255

[56] References Cited

U.S. PATENT DOCUMENTS

| | | | |
|---|---|---|---|
| 3,087,699 | 4/1963 | Foster | 428/107 |
| 4,680,215 | 7/1987 | Mercer | 428/255 X |
| 4,756,746 | 7/1988 | Mercer | 428/255 X |
| 4,930,834 | 6/1990 | Moore | 296/180.1 |
| 5,104,714 | 4/1992 | Leiber et al. | 482/107 X |

FOREIGN PATENT DOCUMENTS

| | | | |
|---|---|---|---|
| 0316749 | 5/1989 | European Pat. Off. | 296/180.1 |
| 234978 | 6/1925 | United Kingdom | 296/85 |
| 235477 | 6/1925 | United Kingdom | 296/85 |
| 2103111 | 2/1983 | United Kingdom | 428/255 |

*Primary Examiner*—Dennis H. Pedder
*Attorney, Agent, or Firm*—Evenson, McKeown, Edwards & Lenahan

[57] ABSTRACT

A wind guard is disclosed for a convertible which is arranged behind a row of seats, extends up beyond this row of seats and runs over the entire width of the interior space and which is formed by a stretched, elastically deformable net which effects a retardation of the air flow appearing from the rear. To further develop a net used here, with regard to an optimum influence on the air flow appearing from the rear, the portion of the clear passage openings to the total net area is about 30 to 35%, the individual passage openings are defined all round by webs extending approximately at right angles to one another and having a round to oval cross-sectional shape, and the wall thickness of the webs is about 0.15 to 0.3 mm.

4 Claims, 2 Drawing Sheets

WIND GUARD FOR A CONVERTIBLE INTERIOR SPACE

This application is a continuation of application Ser. No. 08/043,583, now abandoned, filed Apr. 5, 1993, which is a continuation of application Ser. No. 07/876,909, now abandoned, filed Apr. 30, 1992, which is a continuation of application Ser. No. 07/746,189, now abandoned, filed Aug. 15, 1991, which is a continuation of application Ser. No. 07/523,879, now abandoned, filed May 16, 1990.

BACKGROUND AND SUMMARY OF THE INVENTION

The invention relates to a wind guard for a convertible which is arranged behind a row of seats, extends up beyond this row of seats and runs over the entire width of the interior space and which is formed by a stretched, elastically deformable net which effects a retardation of the air flow appearing from the rear.

A wind guard of this type for a convertible constitutes the subject matter of earlier German Patent Application P 3,836,375.5-21, corresponding to U.S. patent application Ser. No. 07/270,692, filed Nov. 14, 1988, now U.S. Pat. No. 5,219,201.

An object of the present invention is to further develop a net used in a wind guard of this type in such a way that an optimum influence on the air flow appearing from the rear is achieved.

In a wind guard of the generic type, this object is achieved according to certain preferred embodiments of the invention by providing that the proportion of the clear passage openings to the total net area is about 30 to 35% that the individual passage openings are defined all round by webs running approximately at right angles to one another and having a round to oval cross-sectional shape, and that the wall thickness of the webs is about 0.15 to 0.3 mm.

Fold-free stretching of the net is substantially facilitated by features of especially preferred embodiments.

Other objects, advantages and novel features of the present invention will become apparent from the following detailed description of the invention when considered in conjunction with the accompanying drawings.

DETAILED DESCRIPTION OF THE DRAWINGS

Figure 1:
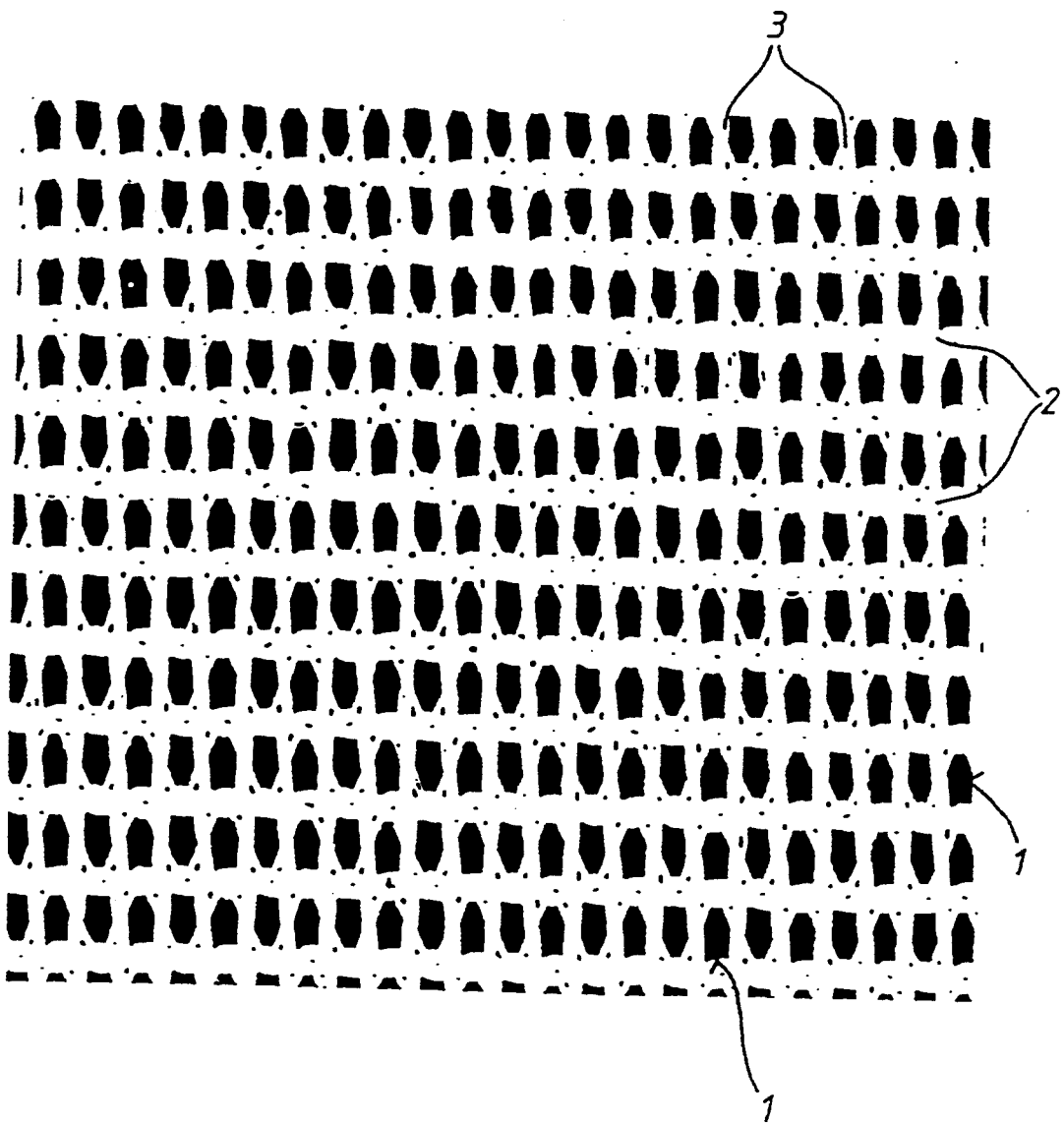
FIG. 1 shows an approximately 10 by 10 mm large net segment, on a greatly enlarged scale, constructed according to a preferred embodiment of the invention.

The net segment shown in FIG. 1 of the drawing has, in the original size, an edge length of in each case about 10 mm.

The clear passage openings appearing dark in the illustration are defined all round by webs 2 and 3, the horizontal webs 2 having a wall thickness of about 0.3 mm and the vertical webs a wall thickness of about 0.15 mm. In one embodiment, approximately twelve of the webs having a wall thickness of about 0.3 mm and approximately twenty of the webs having a wall thickness of about 0.15 mm are arranged in an area of 10×10 mm.

The clear passage openings have a total area portion of 30 to 35%, and the webs 2, 3 accordingly have a total area portion of about 70 to 65%.

Figure 4:
FIG. 4 is a cross-sectional view of a single web of the wind guard.
Figure 5:
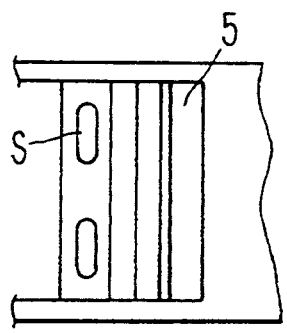
FIG. 5 is a schematic plan view of the wind guard arranged over the entire width of the interior space.

In this arrangement, the webs 2, 3 are to have a round (depicted in schematic form in FIG. 4) to oval cross-section, since sharp-edged cross-sections, as exist, for example, in metal mesh or perforated plates, cause disturbing hissing noises.

During loading of a 5 cm wide and 10 cm long test strip by 10N in the longitudinal direction, the elastic extension of the net material is preferably between 4 and 40%.

Figure 2:
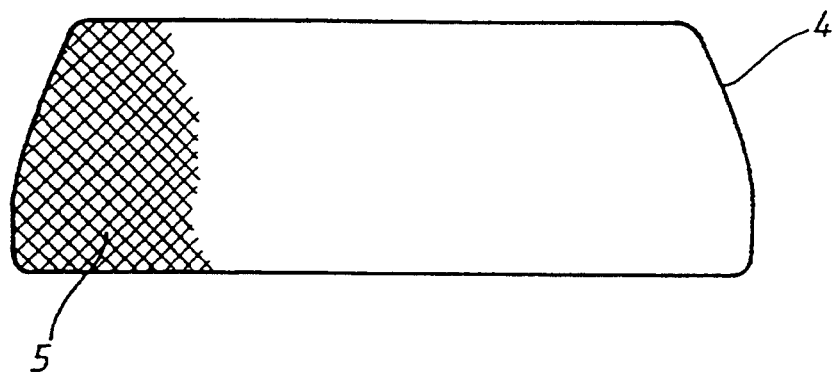
FIG. 2 schematically shows a net according to FIG. 1, stretched in a frame.

Shown in FIG. 2 of the drawing is a frame 4 in which a net 5 is stretched, the latter being turned through about 45° compared with the representation according to FIG. 1. By an arrangement of this type, fold-free restraint of the net 5 is made possible in a simple manner.

Figure 3:
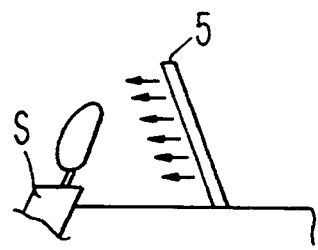
FIG. 3 is a schematic side view of a portion of a vehicle, depicting the location of the net in an in-use position.

FIG. 3 is a schematic side view depicting a row of seats S in a vehicle with a net 5 disposed therebehind.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A wind guard arranged behind a rearwardmost row of seats of convertible vehicle to extend upwardly therebeyond and over the entire width of the interior space and constituted by a stretched, elastically deformable net which effects a retardation of the air flow impinging from the rear, wherein clear passage openings in the net constitute between about 30 to 35% of total net area, individual passage openings of the net are bounded on all sides by webs extending approximately at right angles to one another, and wall thickness of the webs extending in one direction is about 0.15 mm and wall thickness of the webs extending approximately at right angles with respect to the first-mentioned webs is about 0.3 mm.

2. The wind guard according to claim 1, wherein approximately twelve of the webs having the wall thickness of about 0.3 mm and approximately twenty of the webs having the wall thickness of about 0.15 mm are arranged on an area of 10×10 mm.

3. The wind guard according to claim 1, wherein the net is clamped into a frame such that the webs extend at a slope of about 45° to the horizontal.

4. The wind guard according to claim 1, wherein the webs have curved circumferences.

* * * * *